(12) United States Patent
Yoshida et al.

(10) Patent No.: US 10,503,022 B2
(45) Date of Patent: Dec. 10, 2019

(54) LIQUID CRYSTAL PANEL AND LIQUID CRYSTAL DISPLAY APPARATUS

(71) Applicant: SAKAI DISPLAY PRODUCTS CORPORATION, Sakai-shi, Osaka (JP)

(72) Inventors: Yukio Yoshida, Sakai (JP); Masae Kitayama, Sakai (JP); Nobuo Okano, Sakai (JP); Mitsuaki Hirata, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/685,681

(22) Filed: Aug. 24, 2017

(65) Prior Publication Data

US 2017/0351148 A1 Dec. 7, 2017

Related U.S. Application Data

(63) Continuation of application No. PCT/JP2015/055666, filed on Feb. 26, 2015.

(51) Int. Cl.
*G02F 1/1337* (2006.01)
*G02F 1/1362* (2006.01)
(Continued)

(52) U.S. Cl.
CPC .. *G02F 1/133753* (2013.01); *G02F 1/136209* (2013.01); *G02F 1/136286* (2013.01);
(Continued)

(58) Field of Classification Search
CPC ............. G02F 1/1337; G02F 1/133528; G02F 2201/56; H01L 33/20
See application file for complete search history.

(56) References Cited

U.S. PATENT DOCUMENTS

2009/0284703 A1 11/2009 Shoraku et al.
2014/0176856 A1 6/2014 Lee et al.
(Continued)

FOREIGN PATENT DOCUMENTS

JP 2009-229667 A 10/2009
JP 2014-13345 1/2014
(Continued)

OTHER PUBLICATIONS

Int'l. Search Report issued in Int'l. App. No. PCT/JP2015/055666, dated Apr. 28, 2015.

*Primary Examiner* — Paisley L Wilson
*Assistant Examiner* — Mariam Qureshi
(74) *Attorney, Agent, or Firm* — Greer Burns & Crain Ltd.

(57) ABSTRACT

A liquid crystal panel according to an embodiment of the present invention comprises: a liquid crystal layer containing liquid crystal molecules; a first alignment film in contact with a front surface of the liquid crystal layer; and a second alignment film in contact with a rear surface of the liquid crystal layer, the liquid crystal panel being curved in the shape of a cylindrical surface. The first alignment film includes a plurality of first strip portions extending along a first direction and causing the liquid crystal molecules to be aligned. The second alignment film includes a plurality of second strip portions extending along a second direction and causing the liquid crystal molecules to be aligned. The first direction is a peripheral direction of the cylindrical surface. The second direction is a direction which crosses the peripheral direction.

4 Claims, 10 Drawing Sheets

(51) Int. Cl.
    *G02F 1/1335* (2006.01)
    *G02F 1/1368* (2006.01)
(52) U.S. Cl.
    CPC ...... *G02F 1/1368* (2013.01); *G02F 1/133504* (2013.01); *G02F 1/133512* (2013.01); *G02F 1/133514* (2013.01); *G02F 1/133528* (2013.01); *G02F 2001/133738* (2013.01); *G02F 2001/133757* (2013.01); *G02F 2001/133776* (2013.01); *G02F 2201/56* (2013.01)

(56) References Cited

U.S. PATENT DOCUMENTS

| | | | |
|---|---|---|---|
| 2015/0029455 A1 | 1/2015 | Kim et al. | |
| 2015/0109547 A1* | 4/2015 | Kim | G02F 1/133305 349/12 |
| 2016/0097950 A1* | 4/2016 | Chang | G02F 1/133512 349/43 |
| 2016/0202535 A1* | 7/2016 | Seo | G02F 1/133305 349/42 |
| 2016/0209709 A1* | 7/2016 | Park | G02F 1/133753 |
| 2017/0307917 A1* | 10/2017 | Kim | G02F 1/13363 |

FOREIGN PATENT DOCUMENTS

| | | |
|---|---|---|
| JP | 2014-126870 A | 7/2014 |
| JP | 2015-26074 | 2/2015 |
| WO | WO 2006/132369 A1 | 12/2006 |

\* cited by examiner

FIG.2
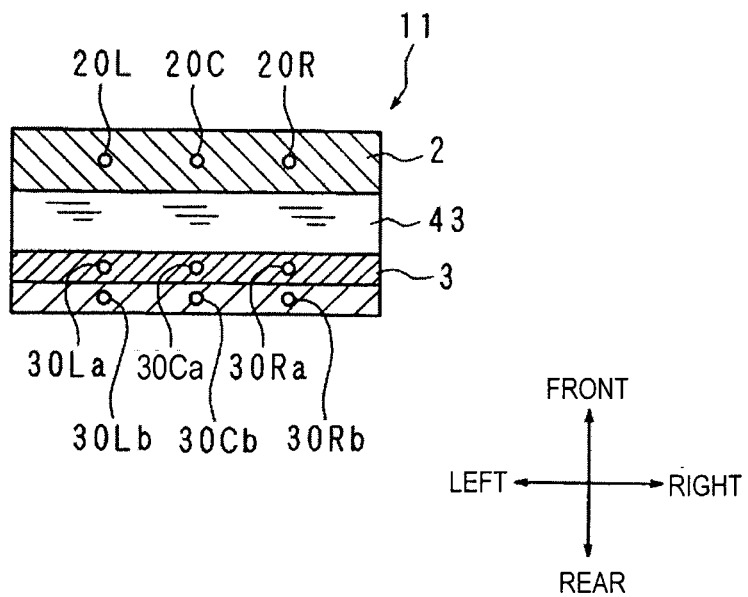
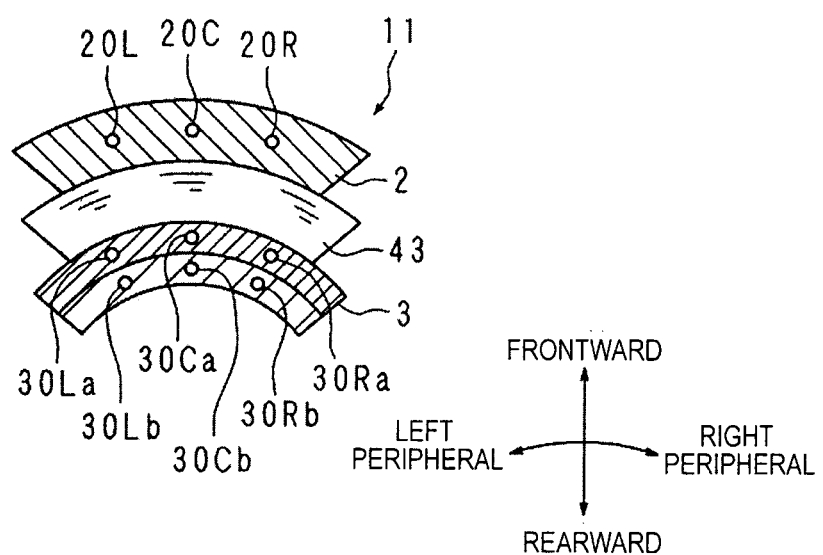

LIQUID CRYSTAL PANEL AND LIQUID CRYSTAL DISPLAY APPARATUS

This is a continuation of International Application No. PCT/JP2015/055666, with an international filing date of Feb. 26, 2015, the entire contents of which are hereby incorporated by reference.

BACKGROUND OF THE INVENTION

1. Field of the Invention

The present invention relates to a liquid crystal panel and a liquid crystal display apparatus of the type which includes alignment films.

2. Description of the Related Art

A liquid crystal panel includes a TFT (Thin Film Transistor) substrate which is responsible for liquid crystal driving, and a counter substrate which faces the TFT substrate. The liquid crystal layer is sealed in between the counter substrate (which is at the frontal surface side) and the TFT substrate (which is at the rear surface side).

The counter substrate or the TFT substrate includes colored layers having the three primary colors of RGB (Red, Green, Blue), the four primary colors of RGBY (Red, Green, Blue, Yellow), the four primary colors of RGBW (Red, Green, Blue, White), or the like. Hereinafter, three primaries of RGB will be illustrated as an example. Each pixel has a colored layer of one of the colors R, G, and B.

The pixel arrangement of a liquid crystal panel is determined by the array structure of a TFT layer which is included in the TFT substrate. In the TFT layer, a plurality of pixel electrodes and a plurality of TFTs are provided in matrix shapes, with which voltages are applied across the liquid crystal layer. Also in the TFT layer, a plurality of wiring lines are provided in rows and columns.

The counter substrate or the TFT substrate includes light shielding members. Pixels are delineated by the light shielding members. The light shielding members may be the light shielding portions of a black matrix (hereinafter referred to as "BM") which has a plurality of openings (non-light shielding portions), and/or the wiring lines in the TFT layer, for example.

Conventionally, in order to improve the viewing angle characteristics of the liquid crystal panel, each pixel may be designed to have a plurality of domains based on alignment division (the pamphlet of International Publication No. 2006/132369; hereinafter "Patent Document 1"). The entire contents of Patent Document 1 are incorporated by reference in this specification.

Each of the counter substrate and the TFT substrate includes an alignment film which is in contact with the liquid crystal layer. On the surface of each alignment film that is in contact with the liquid crystal layer, stripe-shaped alignment regions are provided. The alignment regions include a plurality of strip portions which are parallel to one another. The liquid crystal molecules composing the liquid crystal layer will be aligned along the longitudinal direction of the strip portions.

The longitudinal direction of the strip portions on the frontal surface side is orthogonal to the longitudinal direction of the strip portions on the rear surface side. The longitudinal direction of a boundary between domains in each pixel runs along the longitudinal direction of the strip portions on the frontal surface or rear surface side.

However, the liquid crystal panel described in Patent Document 1 is in a plate form. When the liquid crystal panel is wound around a cylindrical column which is in portrait orientation, the liquid crystal panel will follow along the surface of the cylindrical column, thus being curved in the shape of a cylindrical surface. At this time, the area ratio between domains provided in each pixel may significantly change, thus deteriorating the viewing angle characteristics of the liquid crystal panel.

The present invention has been made in view of the above circumstances, and a main objective thereof is to provide a liquid crystal panel and a liquid crystal display apparatus in which deteriorations in the viewing angle characteristics are suppressed even when they are curved in the shape of a cylindrical surface from being plate-like.

SUMMARY OF THE INVENTION

A liquid crystal panel according to an embodiment of the present invention comprises: a liquid crystal layer containing liquid crystal molecules; a first alignment film in contact with a front surface of the liquid crystal layer; and a second alignment film in contact with a rear surface of the liquid crystal layer, the liquid crystal panel being curved in the shape of a cylindrical surface, wherein, the first alignment film includes a plurality of first strip portions extending along a first direction and causing the liquid crystal molecules to be aligned; the second alignment film includes a plurality of second strip portions extending along a second direction and causing the liquid crystal molecules to be aligned; the first direction is a peripheral direction of the cylindrical surface; and the second direction is a direction which crosses the peripheral direction.

In one embodiment, the liquid crystal panel further comprises: a plurality of first light shielding portions extending along the peripheral direction; and a plurality of second light shielding portions extending along a direction which crosses the peripheral direction, wherein, the plurality of first light shielding portions and the plurality of second light shielding portions define a plurality of pixels; and the plurality of second light shielding portions are closer to a rear surface of the liquid crystal panel than is the second alignment film.

In one embodiment, the liquid crystal panel further comprises a black matrix having a plurality of openings, the plurality of first light shielding portions, and the plurality of second light shielding portions.

In one embodiment, the liquid crystal panel further comprises a first substrate and a second substrate opposed to each other via the liquid crystal layer, wherein, the first substrate includes the first alignment film; the second substrate includes the second alignment film; and the second substrate further includes a color filter layer, the color filter layer including the black matrix and a plurality of colored layers that are provided in the plurality of openings of the black matrix.

In one embodiment, the plurality of second light shielding portions are a plurality of first wiring lines extending along a direction which crosses the peripheral direction.

In one embodiment, the plurality of first light shielding portions are a plurality of second wiring lines extending along the peripheral direction.

In one embodiment, the liquid crystal panel further comprises a first substrate and a second substrate opposed to each other via the liquid crystal layer, wherein, the first substrate includes the first alignment film; the second substrate includes the second alignment film; and the second substrate further includes the plurality of first wiring lines and the plurality of second wiring lines.

In one embodiment, the liquid crystal panel further comprises: a plurality of switching elements in a matrix arrangement; and a plurality of light-shielding members being closer to a frontal surface of the liquid crystal panel than is the first alignment film, the plurality of light-shielding members shielding the plurality of switching elements from light.

In one embodiment, the liquid crystal panel further comprises a black matrix having a plurality of openings and the plurality of first light shielding portions, each opening being larger than each pixel, wherein the plurality of second light shielding portions are a plurality of first wiring lines extending along a direction which crosses the peripheral direction.

In one embodiment, the liquid crystal panel further comprises a first substrate and a second substrate opposed to each other via the liquid crystal layer, wherein, the first substrate includes the first alignment film; the second substrate includes the second alignment film; the first substrate further includes the black matrix; and the second substrate further includes the plurality of first wiring lines.

In one embodiment, the liquid crystal panel has a plurality of pixels, each pixel including a plurality of domains in which the liquid crystal molecules are subject to respectively different directions of alignment.

A liquid crystal display apparatus according to an embodiment of the present invention comprises: a liquid crystal panel of the above construction; and an illuminator to illuminate the liquid crystal panel through a rear surface of the liquid crystal panel.

In an embodiment of the present invention, the direction of alignment of liquid crystal molecules which is conferred by a first alignment film in contact with a front surface of the liquid crystal layer is a peripheral direction of a liquid crystal panel which has been curved in the shape of a cylindrical surface (hereinafter simply referred to as the peripheral direction). On the other hand, the direction of alignment of liquid crystal molecules which is conferred by a second alignment film in contact with a rear surface of the liquid crystal layer is a direction which crosses the peripheral direction.

A liquid crystal panel which has been curved in the shape of a cylindrical surface is obtained by curving a liquid crystal panel, which is in a plate form, into the shape of a cylindrical surface. Hereinafter, a liquid crystal panel which has been curved in the shape of a cylindrical surface will be referred to as a liquid crystal panel having been curved, whereas a liquid crystal panel which is in a plate form will be referred to as an uncurved liquid crystal panel.

As the uncurved liquid crystal panel becomes curved, the locations of strip portions which are provided in the first alignment film and the second alignment film may be dislocated relative to points of reference in the rear surface side of the liquid crystal layer (e.g., pixel electrodes in the TFT layer), in the direction of curving (i.e., the peripheral direction).

The longitudinal direction of strip portions which are provided in the first alignment film (hereinafter referred to as first strip portions) and the longitudinal direction of strip portions which are provided in the second alignment film (hereinafter referred to as second strip portions) correspond to the longitudinal directions of boundaries between domains in each pixel.

Since there is a relatively long separation between the first alignment film and any point of reference in the rear surface side of the liquid crystal layer, dislocations of the first strip portions are relatively large. However, the direction of dislocation of a first strip portion is the longitudinal direction of the first strip portion. Therefore, among the boundaries between domains, the boundary which extends along the longitudinal direction of the first strip portions will be dislocated along its own longitudinal direction. Even if such a dislocation occurs, the area ratio between domains will not change.

Since there is a relatively short separation between the second alignment film and any point of reference in the rear surface side of the liquid crystal layer, dislocations of the second strip portions are relatively small. When a second strip portion undergoes dislocation regarding the peripheral direction, among the boundaries between domains, the boundary which extends along the longitudinal direction of the second strip portions will be dislocated in a direction which crosses its own longitudinal direction. If such a dislocation occurs, the area ratio between domains will change. However, the amount of dislocation will be so small that the area ratio between domains will hardly change.

In an embodiment of the present invention, the longitudinal direction of first light shielding portions is the peripheral direction. On the other hand, the longitudinal direction of second light shielding portions is a direction which crosses the peripheral direction.

A first light shielding portion (or a second light shielding portion) corresponds to one edge along the peripheral direction of a rectangular-shaped pixel (or another edge along a direction which crosses the peripheral direction), for example.

As the uncurved liquid crystal panel becomes curved, the locations of the first light shielding portions and the second light shielding portions may be dislocated regarding the peripheral direction, relative to points of reference in the rear surface side of the liquid crystal layer.

However, even if a first light shielding portion undergoes dislocation regarding the peripheral direction, the first light shielding portions will only be dislocated along one edge of the rectangular-shaped pixel, for example. Therefore, it is unlikely for the first light shielding portion to provide unwanted shading over the inside of the pixel. In other words, the area ratio between domains in each pixel will not change.

On the other hand, if a second light shielding portion undergoes dislocation regarding the peripheral direction, the second light shielding portions will be dislocated in a direction which crosses another edge of the rectangular-shaped pixel. Therefore, the second light shielding portion may provide unwanted shading over the inside of the pixel. This will change the area ratio between domains.

However, dislocations of second light shielding portions which are provided closer to the rear surface of the liquid crystal panel than is the second alignment film are smaller than those of second light shielding portions which are provided closer to the frontal surface of the liquid crystal panel than is the first alignment film. In other words, there is only a negligibly small change in the area ratio between domains.

According to an embodiment of the present invention, a black matrix is closer to the rear surface of the liquid crystal panel than is the second alignment film. Therefore, there is only a negligibly small change in the area ratio between domains in each pixel.

In an embodiment of the present invention, a wiring line corresponds to one edge along the peripheral direction of a rectangular-shaped pixel.

Even if a wiring line undergoes dislocation regarding the peripheral direction, the wiring line will only be dislocated along one edge of the rectangular-shaped pixel, for example. Therefore, it is unlikely for the wiring line to provide unwanted shading over the inside of the pixel. In other words, the area ratio between domains in each pixel will not change.

According to an embodiment of the present invention, light-shielding members are provided closer to the frontal surface of the liquid crystal panel than is the first alignment film; therefore, the substance composing the light-shielding members is restrained from unwantedly exuding to the rear surface side of the liquid crystal layer.

In accordance with a liquid crystal panel and a liquid crystal display apparatus of an embodiment according to the present invention, even if a liquid crystal panel which is in a plate form is curved in the shape of a cylindrical surface, there is only a negligibly small change in the area ratio between domains in each pixel, as compared to that in an uncurved state.

Therefore, deteriorations in the viewing angle characteristics of the liquid crystal panel (and hence the viewing angle characteristics of the liquid crystal display apparatus), as will be caused by significant changes in the area ratio, can be suppressed.

BRIEF DESCRIPTION OF THE DRAWINGS

FIG. 2 is a cross-sectional view schematically showing a liquid crystal panel of a liquid crystal display apparatus in an uncurved state and in a curved state.

DETAILED DESCRIPTION OF PREFERRED EMBODIMENTS

Hereinafter, the present invention will be described in detail, based on the figures illustrating embodiments thereof. The following description will rely on the definitions of UP/DOWN, FRONT/REAR, and RIGHT/LEFT indicated by the arrowheads in each figure.

Embodiment 1

Figure 1:
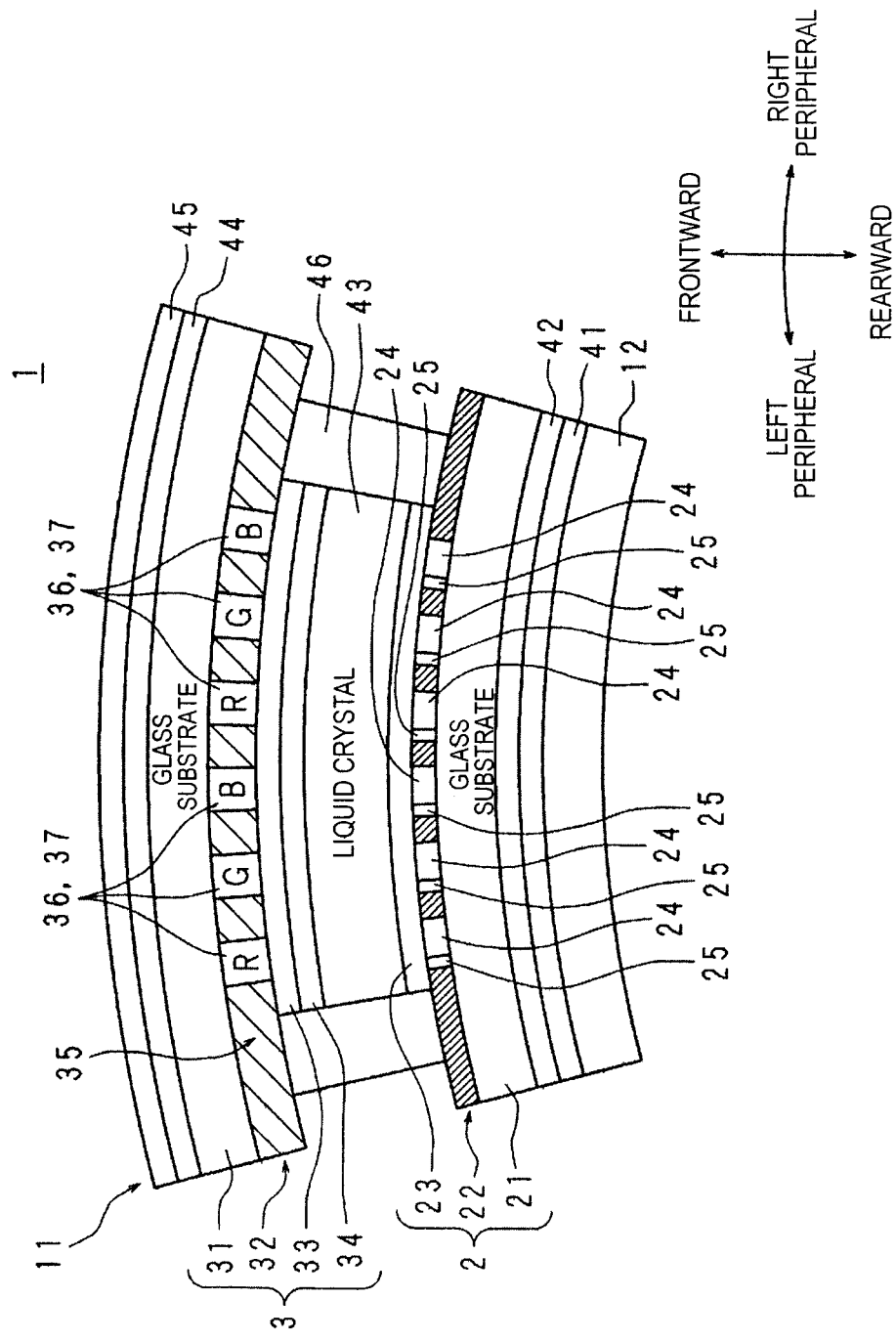
FIG. 1 is a cross-sectional view schematically showing the construction of a liquid crystal display apparatus according to Embodiment 1 of the present invention.

FIG. 1 is a cross-sectional view schematically showing the construction of a liquid crystal display apparatus 1 according to Embodiment 1 of the present invention.

The liquid crystal display apparatus 1 of the present embodiment is constructed as a television receiver, a display of a personal computer, or the like. The liquid crystal display apparatus 1 displays a color image by using three primaries of RGB.

The liquid crystal display apparatus 1 is curved in the shape of a cylindrical surface. Herein, a peripheral direction of the cylindrical surface is defined as the direction in which the liquid crystal display apparatus 1 is curved. An axial direction of the cylindrical surface is defined as a direction (which in the present embodiment is the up-down direction) that crosses the peripheral direction.

Hereinafter, a rectangle or a matrix in an uncurved planar state, and these having been curved in the shape of a cylindrical surface, will both be indiscriminately referred to as a rectangle or a matrix.

The liquid crystal display apparatus 1 includes a rectangular-shaped liquid crystal panel 11 and an illuminator 12. The liquid crystal panel 11 constitutes the front of the liquid crystal display apparatus 1, whereas the illuminator constitutes the rear of the liquid crystal display apparatus 1. The liquid crystal panel 11 and the illuminator are both curved shapes, in the manner of cylindrical surfaces.

The liquid crystal panel 11 includes a TFT substrate 2, a counter substrate 3, a diffuser 41, polarizers 42 and 44, a liquid crystal layer 43, a protection glass 45, and a sealing portion 46.

The TFT substrate 2 includes a glass substrate 21, a TFT layer 22, and an alignment film 23 (rear alignment film). The TFT layer 22 includes pixel electrodes 24, TFTs 25, and a plurality of signal lines and a plurality of gate lines which are not shown. In FIG. 1, hatching lines extending in the lower-right direction indicate anything in the TFT layer 22 other than the pixel electrodes 24 and the TFTs 25.

The counter substrate 3 includes a glass substrate 31, a color filter layer 32, a transparent electrode layer 33, and an alignment film 34 (front alignment film). The color filter layer 32 includes a BM 35 (light shielding layer) and colored layers 36. The BM 35 in the color filter layer 32 has openings 37 (which are non-light shielding portions) as well as light shielding portions. In FIG. 1, hatching lines extending in the upper-right direction indicate the light shielding portions of the BM 35.

The liquid crystal panel 11 is a result of allowing what is actually a plate-like liquid crystal panel to be curved in the shape of a cylindrical surface. The up-down direction and the right-left direction of the uncurved liquid crystal panel 11 correspond to the up-down direction and the peripheral direction, respectively, of the liquid crystal panel 11 having been curved. The front-rear direction of the uncurved liquid crystal panel 11 corresponds to the normal direction of the cylindrical surface of the liquid crystal panel 11 having been curved. Hereinafter, counterparts of the left direction/right direction (and the front direction/rear direction) of the uncurved liquid crystal panel 11 will be referred to as the left peripheral direction/right peripheral direction (and the frontward direction/rearward direction).

The liquid crystal panel 11 has a rectangular-shaped displaying region and a frame region of a rectangular frame shape which surrounds the displaying region. In the displaying region of the liquid crystal panel 11, a plurality of pixels are provided in a matrix shape. Each pixel according to the present embodiment may be a subpixel of a multipixel, or a regular pixel not pertaining to a multipixel. The pixels may be equal or unequal in size and/or shape. Hereinafter, for simplicity of description, it will be assumed that the respective pixels are congruent rectangular shapes.

The diffuser 41, the polarizer 42, the TFT substrate 2, the liquid crystal layer 43, the counter substrate 3, the polarizer 44, and the protection glass 45 of the liquid crystal panel 11 are disposed in this order, from the rear side to the front side.

The diffuser 41 and the polarizer 42 each have a rectangular shape and are light-transmissive. The polarizer 42 is stacked on the front surface of the diffuser 41.

The glass substrate 21, the TFT layer 22, and the alignment film 23 of the TFT substrate 2 are disposed in this order, from the rear side to the front side.

The glass substrate 21 has a rectangular shape and is light-transmissive. The glass substrate 21 is stacked on the front surface of the polarizer 42.

The TFT layer 22 has a rectangular shape that is stacked on the front surface of the glass substrate 21.

The signal lines and gate lines in the TFT layer 22 are light-shielding. A plurality of signal lines are provided along the peripheral direction. The longitudinal direction of the signal lines corresponds to the up-down direction. A plurality of gate lines are provided along the up-down direction. The longitudinal direction of each gate line corresponds to the peripheral direction. The signal lines and the gate lines intersect one another in the manner of a grating, with electrical insulation therebetween.

The pixel electrodes 24 and the TFTs 25 are provided in matrix shapes. Each pixel includes one pixel electrode 24 and one TFT 25.

The pixel electrodes 24 are light-transmissive. The location of each pixel electrode 24 is in the center of the pixel.

A source electrode, a gate electrode, and a drain electrode of each TFT 25 are electrically connected to one of the signal lines, one of the gate lines, and one of the pixel electrodes 24, respectively. The TFTs 25 are shaded by the gate lines, the light shielding portions of the BM 35, and the like.

The alignment film 23 is light-transmissive. The alignment film 23 has a rectangular shape that is stacked on the displaying region of the front surface of the TFT layer 22. Stripe-shaped alignment regions are provided on the front surface of the alignment film 23.

The glass substrate 31, the color filter layer 32, the transparent electrode layer 33, and the alignment film 34 of the counter substrate 3 are disposed in this order, from the front side to the rear side.

The glass substrate 31 has a rectangular shape and is light-transmissive.

The color filter layer 32 has a rectangular shape that is stacked onto the rear surface of the glass substrate 31.

The openings 37 in the BM 35 of the color filter layer 32 each have a rectangular shape, and are provided in a matrix shape in the displaying region of the BM 35. The light shielding portions of the BM 35 define portions of the BM 35 other than the openings 37, such that portions extending along the up-down direction and portions extending along the peripheral direction cross one another in the manner of a grating.

The BM 35 is obtained by applying photolithography to a layer of light-shielding material which has been formed on the rear surface of the glass substrate 31.

Each pixel may have one opening 37; in this case, pixels are delineated by the light shielding portions of the BM 35. Alternatively, a plurality of pixels may share one opening 37, such that different pixels correspond to different portions within the opening 37; in this case, these pixels are delineated by the light shielding portions of the BM 35 and the non-light transmitting portions (e.g., gate lines in the TFT layer 22, gaps provided in the transparent electrode layer 33, and so on), i.e., portions other than the light shielding portions of the BM 35.

The colored layers 36 are provided by applying photolithography to a colored material layer which is made on the light shielding portions of the BM 35 and in each opening 37. Each colored layer 36 is light-transmissive, and has one of the colors R, C, and B. Each opening 37 is closed by a colored layer 36 of one of these colors.

The transparent electrode layer 33 has a rectangular shape that is stacked onto the displaying region of the rear surface of the color filter layer 32. The transparent electrode layer 33 functions as a common electrode opposite the pixel electrodes 24.

The alignment film 34 is light-transmissive. The alignment film 34 has a rectangular shape that is stacked onto the rear surface of the transparent electrode layer 33. Stripe-shaped alignment regions are provided on the rear surface of the alignment film 34.

The polarizer 44 and the protection glass 45 each have a rectangular shape and are light-transmissive. The polarizer 44 is stacked on the front surface of the glass substrate 31, whereas the protection glass 45 is stacked on the front surface of the polarizer 44.

The polarizers 42 and 44 respectively transmit linearly polarized light beams which are orthogonal to each other.

The TFT substrate 2 and the counter substrate 3 are opposed to each other, in such a manner that their alignment films 23 and 34 are facing each other.

The sealing portion 46 has a rectangular frame shape and is light-shielding. Between the TFT substrate 2 and the counter substrate 3, the sealing portion 46 is adhesively bonded to the respective frame regions of the TFT substrate 2 and the counter substrate 3. In other words, the TFT substrate 2 and the counter substrate 3 are adhesively bonded together via the sealing portion 46.

The liquid crystal layer 43, which is light-transmissive, is disposed in a space that is between the TFT substrate 2 and the counter substrate 3 and surrounded by the sealing portion 46. In other words, the liquid crystal layer 43 is sealed in between the TFT substrate 2 and the counter substrate 3 by the sealing portion 46.

The rear surface of the liquid crystal layer 43 (i.e., the surface on the rear surface side of the liquid crystal panel) is in contact with the alignment regions of the alignment film 23, and the front surface of the liquid crystal layer 43 (i.e., the surface on the frontal surface side of the liquid crystal panel) is in contact with the alignment regions of the alignment film 34.

The illuminator 12 is an illuminator of direct type or edge light type. The illuminator 12 includes what is obtained by curving a plate-like optical sheet into the shape of a cylindrical surface, a light guide plate which has been formed into the shape of a cylindrical surface (neither is shown), and the like. The illuminator 12 provides illumination in the forward direction of itself.

Next, displaying of a color image by the liquid crystal display apparatus 1 will be described.

The illuminator 12 illuminates the liquid crystal panel 11 from behind.

Light which has been emitted from the illuminator 12 becomes diffused as it goes through the diffuser 41. The diffused light is transmitted through the polarizer 42 and thereafter is incident on the TFT substrate 2.

The light which is incident on the TFT substrate 2 is consecutively transmitted through the glass substrate 21, pixel electrodes 24, and the alignment film 23, and thereafter is incident on the liquid crystal layer 43.

Each TFT 25 is a switching element to drive liquid crystal molecules in the liquid crystal layer 43. The signal lines and gate lines in the TFT layer 22 are wiring lines with which to drive liquid crystal molecules in the liquid crystal layer 43.

When a TFT 25 is turned ON via a gate line, a voltage is applied between the pixel electrode 24 and the transparent electrode layer 33 via the signal line and the TFT 25. As a result, the voltage is applied across the liquid crystal layer 43.

When no voltage is applied across the liquid crystal layer 43, the light which is incident on the liquid crystal layer 43 is straightforwardly transmitted through the liquid crystal layer 43.

On the other hand, when a voltage is applied across the liquid crystal layer 43, liquid crystal molecules in the liquid crystal layer 43 change their arrangement. The light which is incident on the liquid crystal layer 43 has its polarization changed by the liquid crystal layer 43, and thereafter is transmitted through the liquid crystal layer 43.

The light which has been transmitted through the liquid crystal layer 43 is incident on the counter substrate 3.

The light which is incident on the counter substrate 3 is consecutively transmitted through the alignment film 34, the transparent electrode layer 33, the colored layers 36, and the glass substrate 31 before it goes out.

The light which has been straightforwardly transmitted through the liquid crystal layer 43 goes out of the counter substrate 3, but thereafter is intercepted by the polarizer 44. The light which has had its polarization changed by the liquid crystal layer 43 goes out of the counter substrate 3, and thereafter is consecutively transmitted through the polarizer 44 and the protection glass 45 so as to go out to the exterior.

As a result of the above, a color image is displayed in the displaying region of the liquid crystal panel 11.

FIG. 2 is a cross-sectional view schematically showing the liquid crystal panel 11 of the liquid crystal display apparatus 1 in an uncurved state and in a curved state.

FIG. 2 shows the TFT substrate 2 (i.e., a portion indicated by hatching lines extending in the lower-right direction), the counter substrate 3 (i.e., a portion indicated by hatching lines extending in the upper-right direction), and the liquid crystal layer 43 of the liquid crystal panel 11.

In the figure, imaginary indices 20 and 30 are provided in order to explain dislocations along the peripheral direction as caused by curving of the liquid crystal panel 11.

The indices 20 (and indices 30) are distributed over the TFT substrate 2 (and over the counter substrate 3). In the following description, suffix C identifies an index indicating a central position along the right-left direction. Suffix L (or suffix R) identifies an index indicating a position to the left (or right) of the central position. Suffix a (or suffix b) identifies an index indicating the front side (or rear side) inside the TFT substrate 2 (or the counter substrate 3).

The uncurved liquid crystal panel 11 has a plate-like shape. In this state, indices 20C, 30Ca and 30Cb are aligned along the front-rear direction. In other words, indices 20C, 30Ca and 30Cb are in the same position with regard to the right-left direction. Similarly, indices 20L, 30La and 30Lb (and indices 20R, 30Ra and 30Rb) are in the same position with regard to the right-left direction.

Given that indices 20C, 30Ca and 30Cb are in the same position with regard to the right-left direction, when the liquid crystal panel 11 is curved, index 20L will be dislocated relative to indices 30La and 30Lb regarding the peripheral direction (so as to be shifted in the right peripheral direction), and index 20R will be dislocated relative to indices 30Ra and 30Rb regarding the peripheral direction (so as to be shifted in the left peripheral direction). The reason is that the TFT substrate 2 and the counter substrate 3 are curved into cylindrical surfaces with respectively different radii of curvature.

Indices 30La and 30Ra will also be dislocated relative to indices 30Lb and 30Rb, respectively, regarding the peripheral direction. However, their separation along the normal direction is sufficiently shorter than the separation between index 20L and indices 30La, 30Lb along the normal direction (or the separation between index 20R and indices 30Ra, 30Rb along the normal direction). Therefore, the dislocations of indices 30La and 30Ra relative to indices 30Lb and 30Rb are negligibly small.

Figure 3:
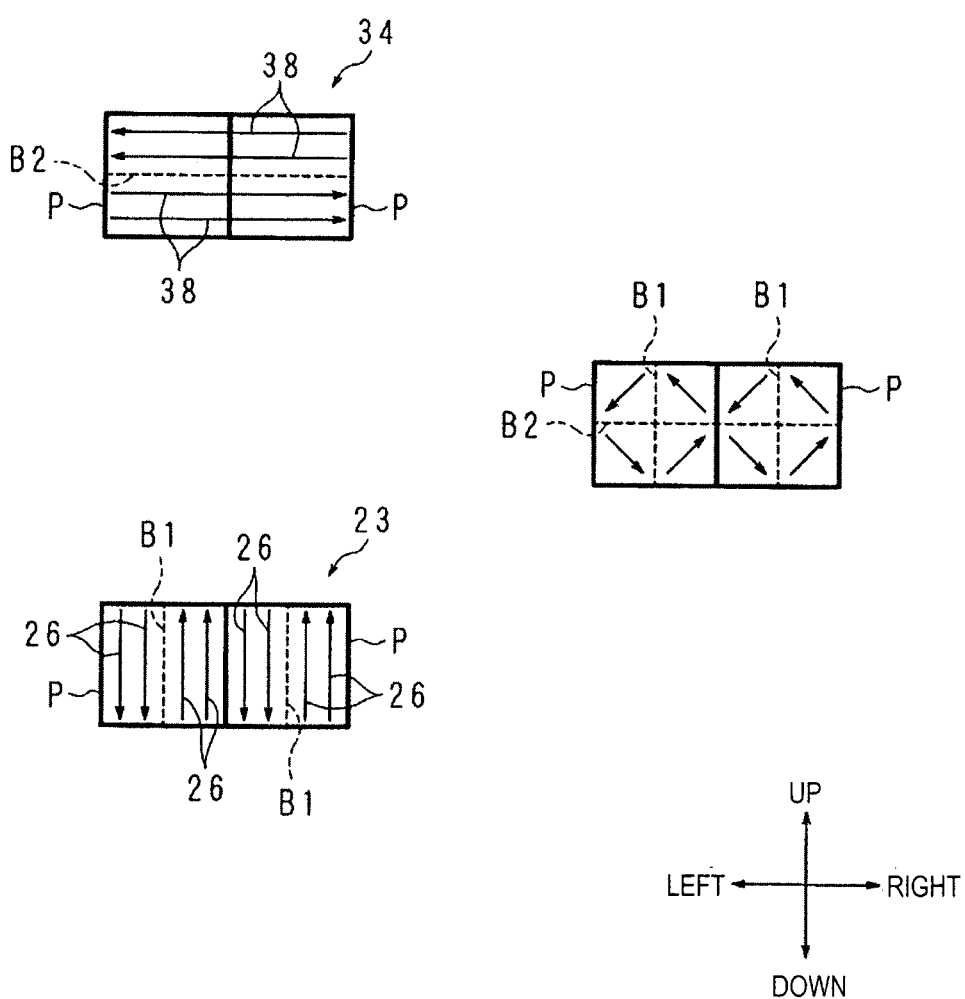
FIG. 3 is a front view schematically showing pixels of a liquid crystal panel in an uncurved state.
Figure 4:
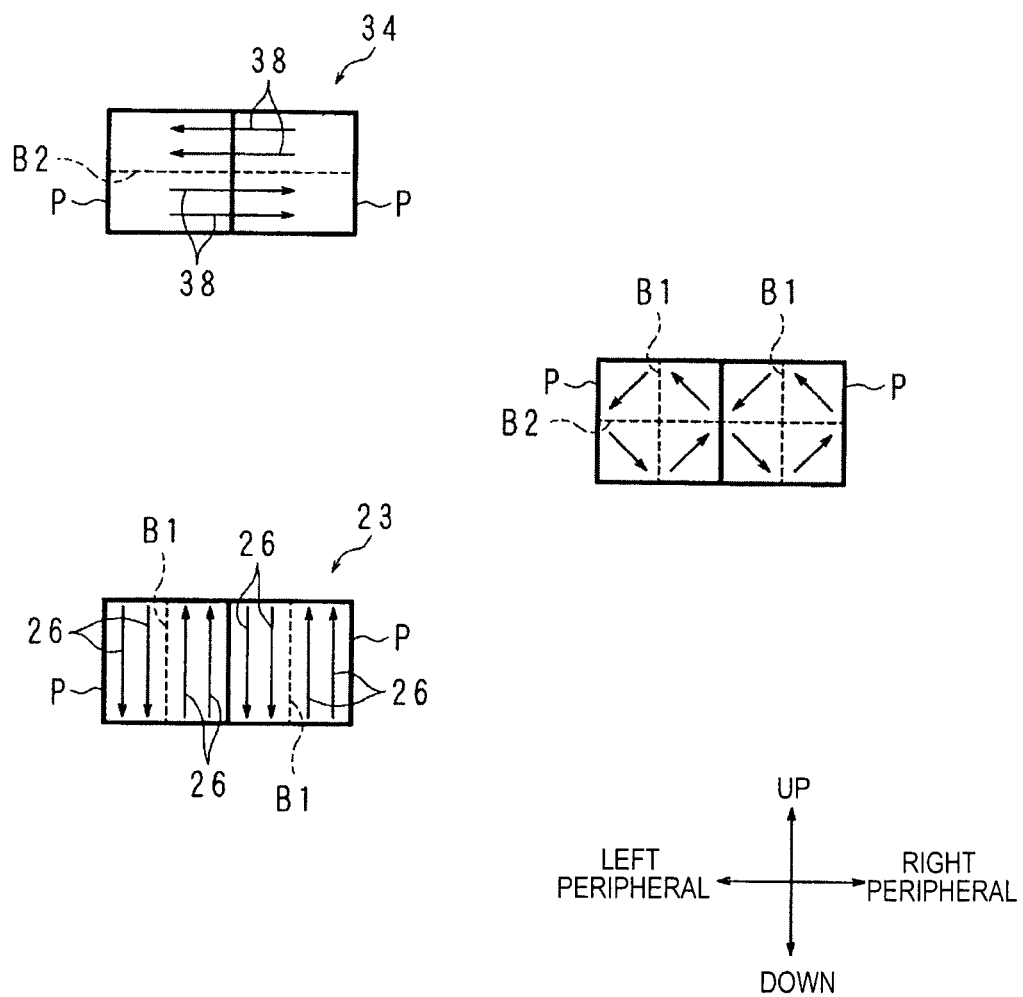
FIG. 4 is a front view schematically showing pixels of a liquid crystal panel in a curved state.

FIGS. 3 and 4 are front views schematically showing pixels p of the liquid crystal panel 11 in an uncurved state and in a curved state, respectively. Thick solid lines shown in FIGS. 3 and 4 illustrate the periphery of the respective pixels P. The array structure of the TFT layer 22 determines the shape and location of the periphery of each pixel P. The left-hand portion of FIGS. 3 and 4 provides front views schematically showing the alignment regions in the alignment films 23 and 34, whereas the right-hand portion of FIGS. 3 and 4 provides a front view two adjacent pixels P and P along the right-left direction (or the peripheral direction).

The alignment regions in the alignment film 23 include strip portions 26. The strip portions 26, which are made of rises and falls formed on the alignment film 23, flank one another along the right-left direction (or the peripheral direction). The longitudinal direction of each strip portion 26 corresponds to the up-down direction.

Liquid crystal molecules in the liquid crystal layer 43 will be aligned along the longitudinal direction of each strip portion 26. In each pixel, one strip portion 26 causes the liquid crystal molecules to be aligned toward one end of the longitudinal direction, whereas another strip Portion 26 causes the liquid crystal molecules to be aligned toward the other end of the longitudinal direction. The alignment film 23 includes a plurality of strip portions 26, such that strip portions 26 causing the liquid crystal molecules to be aligned toward one end of the longitudinal direction and strip portions 26 causing the liquid crystal molecules to be aligned toward the other end of the longitudinal direction alternate along the right-left direction (or the peripheral direction).

The alignment film 34 is substantially identical in construction to the alignment film 23, except that the alignment regions in the alignment film 34 include strip portions 38, which flank one another along the up-down direction. The longitudinal direction of each strip portion 38 corresponds to the right-left direction (or the peripheral direction). The alignment film 34 includes a plurality of strip portions 38, such that strip portions 38 causing the liquid crystal molecules to be aligned toward one end of the longitudinal direction and strip portions 38 causing the liquid crystal molecules to be aligned toward the other end of the longitudinal direction alternate along the up-down direction.

As the liquid crystal molecules in the liquid crystal layer 43 become aligned along the strip portions 26 and the strip portions 38, four rectangular-shaped domains are created in a matrix shape within each pixel P. Liquid crystal molecules in different domains are subject to different directions of alignment.

Broken lines in FIGS. 3 and 4 represent boundaries B1 and B2 between the domains. In each pixel P, a boundary B1 having a longitudinal direction in the up-down direction and a boundary B2 having a longitudinal direction in the right-left direction (or the peripheral direction) occur in a cross shape. The longitudinal direction and location of the boundary B1 correspond to the longitudinal direction and location of the strip portions 26, whereas the longitudinal direction and location of the boundary B2 correspond to the longitudinal direction and location of the strip portions 38.

As the liquid crystal panel 11 becomes curved, the strip portions 26 and the strip portions 38 are dislocated relative to points of reference in the TFT layer 22, regarding the peripheral direction.

When the strip portions 26 are dislocated regarding the peripheral direction, the boundary B1 will dislocate in a direction which crosses its own longitudinal direction. However, since the alignment film 23 adjoins the TFT layer 22, dislocations of the strip portions 26 regarding the peripheral direction will be negligibly small. Therefore, the dislocation of the boundary B1 in a direction which crosses the longitudinal direction will also be negligibly small.

On the other hand, the alignment film 34 is distant from the TFT layer 22, and thus dislocations of the strip portions 38 regarding the peripheral direction will be greater than dislocations of the strip portions 26 regarding the peripheral direction. Therefore, the boundary B2 will be dislocated along the longitudinal direction of the boundary B2. However, the boundary B2 will not be dislocated in a direction which crosses the longitudinal direction of the boundary B2.

In other words, the boundaries B1 and B2 will not undergo any dislocation that will cause a significant change in the area ratio between domains in each pixel P.

In the liquid crystal display apparatus 1 as such, the uncurved liquid crystal panel 11 has alignment division in each pixel P, whereby viewing angle characteristics are improved over the case without alignment division.

On the other hand, in the liquid crystal panel 11 having been curved, the area ratio between domains in each pixel is substantially equal to that in an uncurved state. Therefore, it is possible to suppress deteriorations in the viewing angle characteristics due to significant changes in the area ratio.

Figure 5:
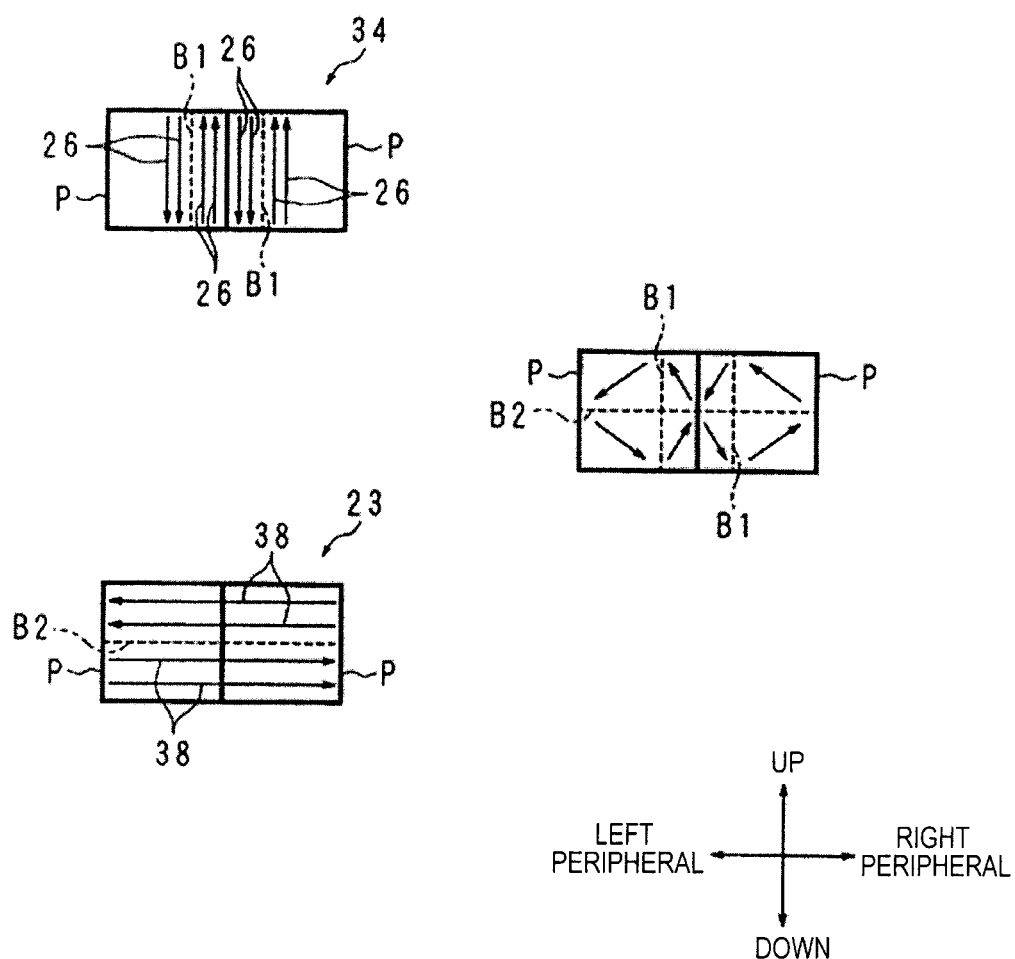
FIG. 5 is a front view for describing the operation and effect of a liquid crystal panel.

FIG. 5 is a front view for describing the operation and effect of the liquid crystal panel 11.

FIG. 5 corresponds to FIG. 4. However, strip portions 38 are provided side by side in the alignment film 23, whereas strip portions 26 are provided side by side in the alignment film 34.

In this case, dislocations of the strip portions 38 regarding the peripheral direction are negligibly small. Therefore, the dislocation of the boundary B2 regarding the longitudinal direction will be negligibly small.

On the other hand, dislocations of the strip portions 26 regarding the peripheral direction will be greater than dislocations of the strip portions 38 regarding the peripheral direction. Therefore, the boundary B1 will be significantly dislocated in a direction which crosses the longitudinal direction of the boundary B1.

In other words, while the boundary B2 will not undergo any dislocation that will cause a significant change in the area ratio between domains in each pixel P, the boundary B1 will undergo a dislocation that will cause a significant change in the area ratio between domains in each pixel P. As a result of this, viewing angle characteristics of the liquid crystal panel 11 will be deteriorated.

Embodiment 2

Figure 6:
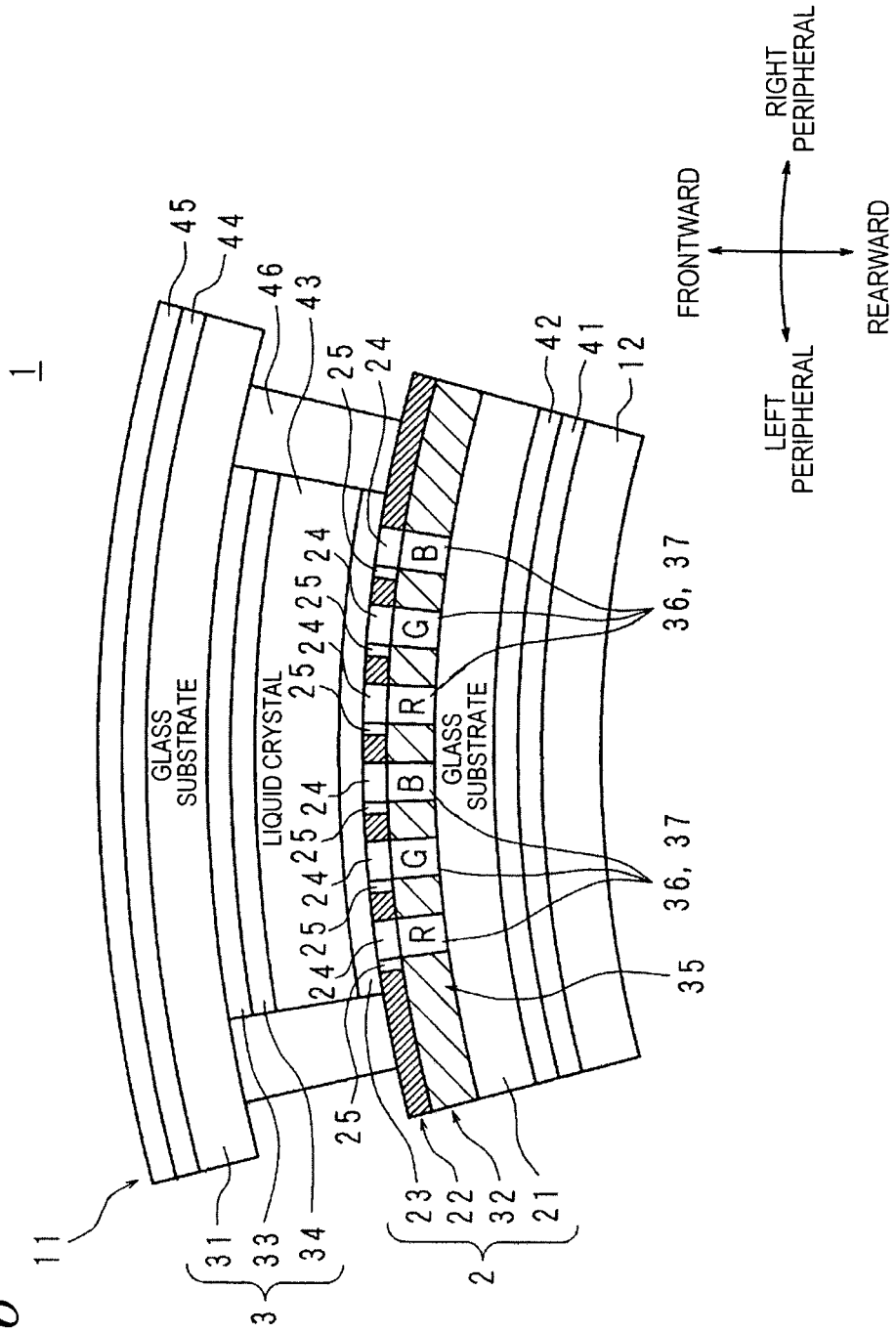
FIG. 6 is a cross-sectional view schematically showing the construction of a liquid crystal display apparatus according to Embodiment 2 of the present invention.

FIG. 6 is a cross-sectional view schematically showing the construction of a liquid crystal display apparatus 1 according to Embodiment 2 of the present invention. FIG. 6 corresponds to FIG. 1.

The liquid crystal display apparatus 1 of the present embodiment is substantially identical in construction to the liquid crystal display apparatus 1 of Embodiment 1. Hereinafter, differences from Embodiment 1 will be described, while any portion having a corresponding counterpart in Embodiment 1 will be denoted by an identical reference numeral, with its description being omitted.

The counter substrate 3 according to the present embodiment does not include a color filter layer 32. Consequently, the transparent electrode layer 33 is stacked onto the displaying region of the rear surface of the glass substrate 31.

The TFT substrate 2 according to the present embodiment includes a color filter layer 32. The color filter layer 32 is interposed between the glass substrate 21 and the TFT layer 22. In other words, the color filter layer 32 is closer to the rear surface of the liquid crystal panel than is the alignment film 23.

Figure 7:
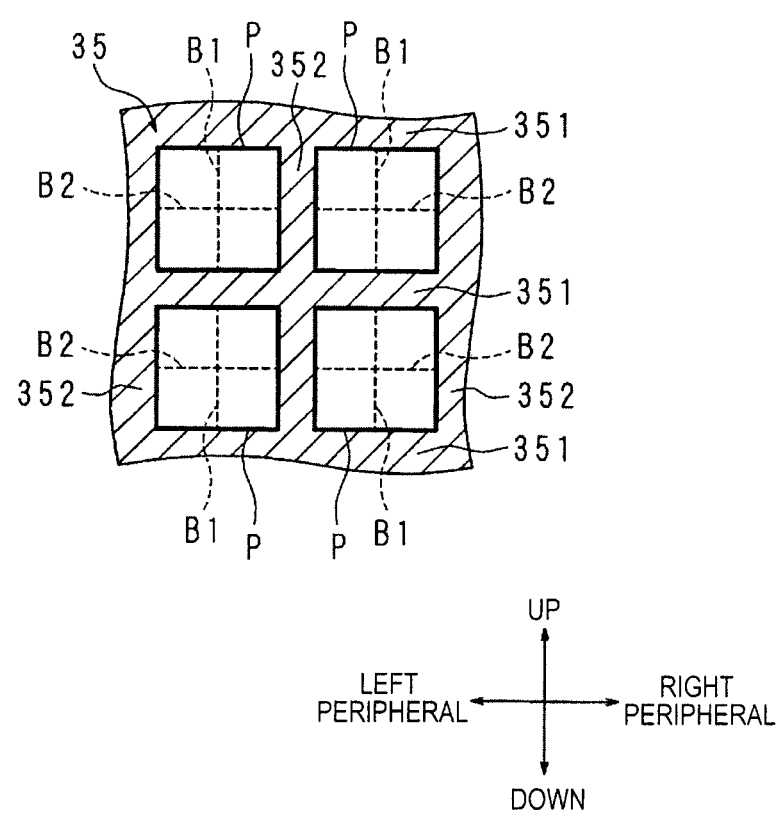
FIG. 7 is a front view schematically showing pixels in a liquid crystal panel of a liquid crystal display apparatus.

FIG. 7 is a front view schematically showing pixels in the liquid crystal panel 11 of the liquid crystal display apparatus 1. Thick solid lines shown in FIG. 7 illustrate the periphery of the respective pixels P. FIG. 7 shows four adjacent pixels P along the up-down direction and the peripheral direction. The hatching in FIG. 7 represents light shielding portions of the BM 35.

Each pixel P has one opening 37.

In the BM 35, a plurality of peripheral-direction light shielding portions 351 and a plurality of cross-direction light shielding portions 352 are provided so that they cross one another in the manner of a grating. Each peripheral-direction light shielding portion 351 is a light shielding portion of the BM 35 that is elongated along the peripheral direction, whereas each cross-direction light shielding portion 352 is a light shielding portion of the BM 35 that is elongated along the up-down direction.

Each pixel P is surrounded by two peripheral-direction light shielding portions 351 adjoining each other along the up-down direction and two cross-direction light shielding portions 352 adjoining each other along the peripheral direction. In other words, pixels P are delineated by light shielding portions of the BM 35.

The color filter layer 32 adjoins the TFT layer 22. Therefore, regarding the peripheral direction, dislocations of the peripheral-direction light shielding portions 351 and the cross-direction light shielding portions 352 relative to points of reference in the TFT layer 22 are negligibly small.

Consequently, the area ratio between domains in each pixel P of the liquid crystal panel 11 in an uncurved state and the area ratio between domains in each pixel P of the liquid crystal panel 11 in a curved state are substantially equal.

The liquid crystal display apparatus 1 as such can achieve a similar operation and effect to what is achieved by the liquid crystal display apparatus 1 of Embodiment 1. Moreover, it is possible to suppress deteriorations in the viewing angle characteristics associated with dislocations of light shielding portions of the BM 35 due to curving.

Figure 8:
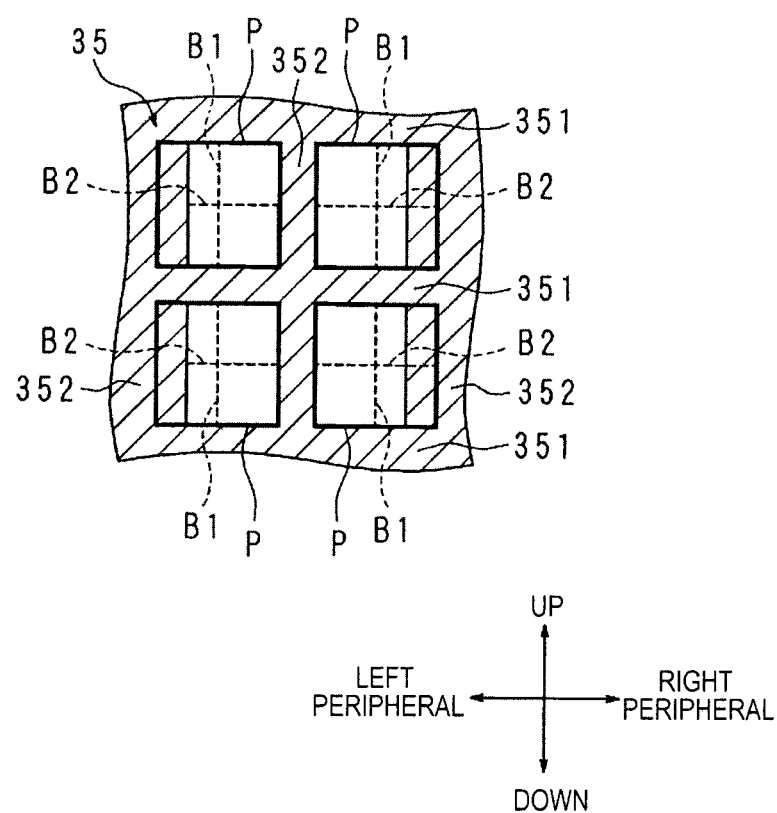
FIG. 8 is a front view for describing the operation and effect of a liquid crystal panel.

FIG. 8 is a front view for describing the operation and effect of the liquid crystal panel 11.

FIG. 8 corresponds to FIG. 7. However, as in the case of Embodiment 1, the color filter layer 32 belongs to the counter substrate 3.

In this case, regarding the peripheral direction, dislocations of the peripheral-direction light shielding portions 351 and the cross-direction light shielding portions 352 relative to points of reference in the TFT layer 22 are greater than those in the case where the color filter layer 32 belongs to the TFT substrate 2.

The peripheral-direction light shielding portions 351, having undergone dislocations regarding the peripheral direction, will never come into the bounds of each pixel P.

However, the cross-direction light shielding portions 352, having undergone dislocations regarding the peripheral direction, may come into the bounds of each pixel P. At this time, a part of the plurality of domains may be shaded by the cross-direction light shielding portions 352.

Consequently, the area ratio between domains in each pixel P of the liquid crystal panel 11 in an uncurved state and the area ratio between domains in each pixel P of the liquid crystal panel 11 in a curved state are significantly different. As a result of this, viewing angle characteristics of the liquid crystal panel 11 will be deteriorated.

Moreover, the aperture ratio may decrease due to intrusion of the cross-direction light shielding portions 352 into the pixel P, and failure to shade portions that need to be shaded by the cross-direction light shielding portions 352 (e.g., regions with poor domain separation) may deteriorate the display quality.

Even in a context where the color filter layer 32 belongs to the counter substrate 3 as in Embodiment 1, there may be a case where the area ratio between domains does not change before and after curving, i.e., a case where the peripheral-direction light shielding portions 351 having undergone dislocations regarding the peripheral direction due to curving are not inside the pixels P (e.g., being in portions that are shaded by light shielding members other than the light shielding portions of the BM 35).

Embodiment 3

Figure 9:
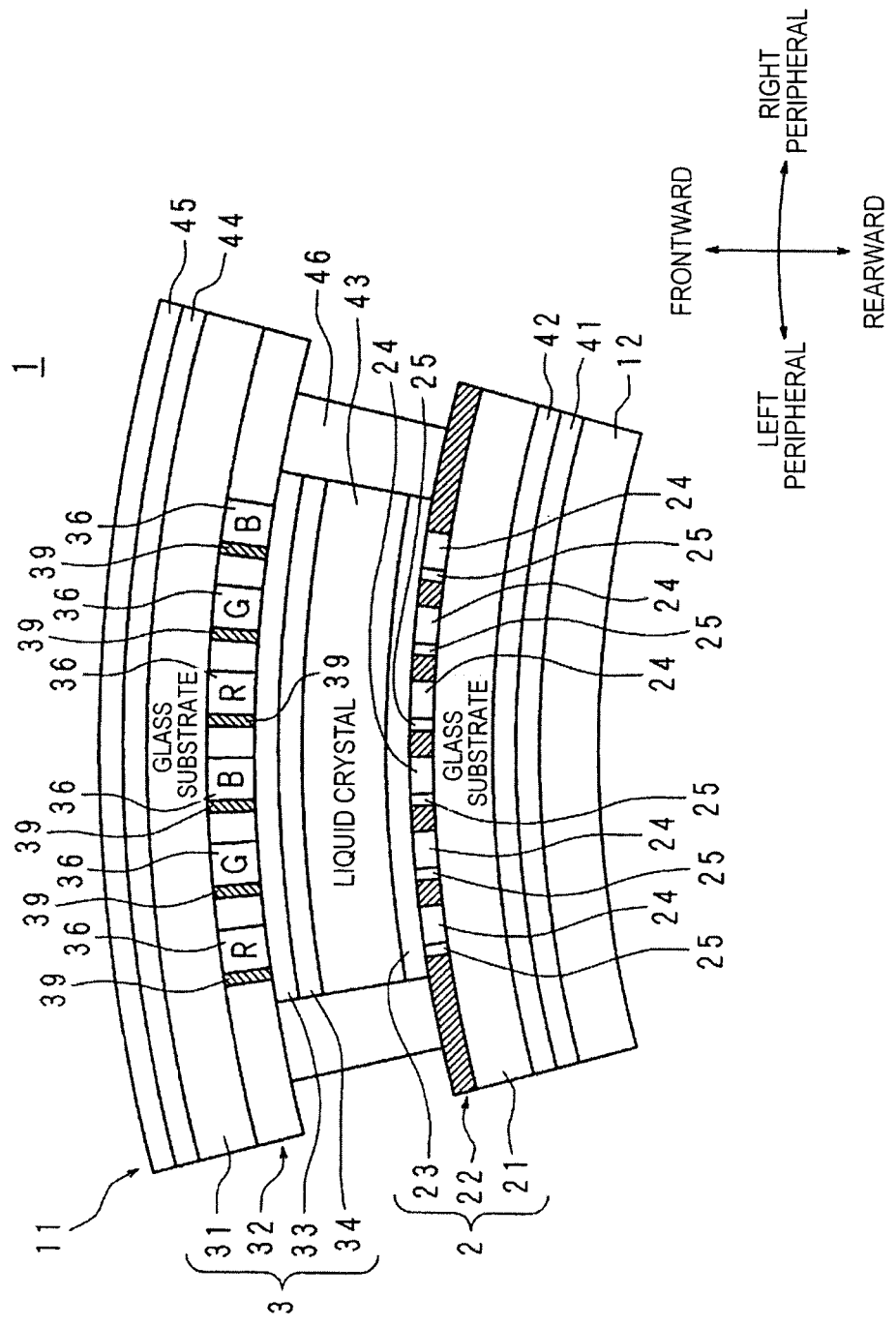
FIG. 9 is a cross-sectional view schematically showing the construction of a liquid crystal display apparatus according to Embodiment 3 of the present invention.

FIG. 9 is a cross-sectional view schematically showing the construction of a liquid crystal display apparatus 1 according to Embodiment 3 of the present invention. FIG. 9 corresponds to FIG. 1.

Figure 10:
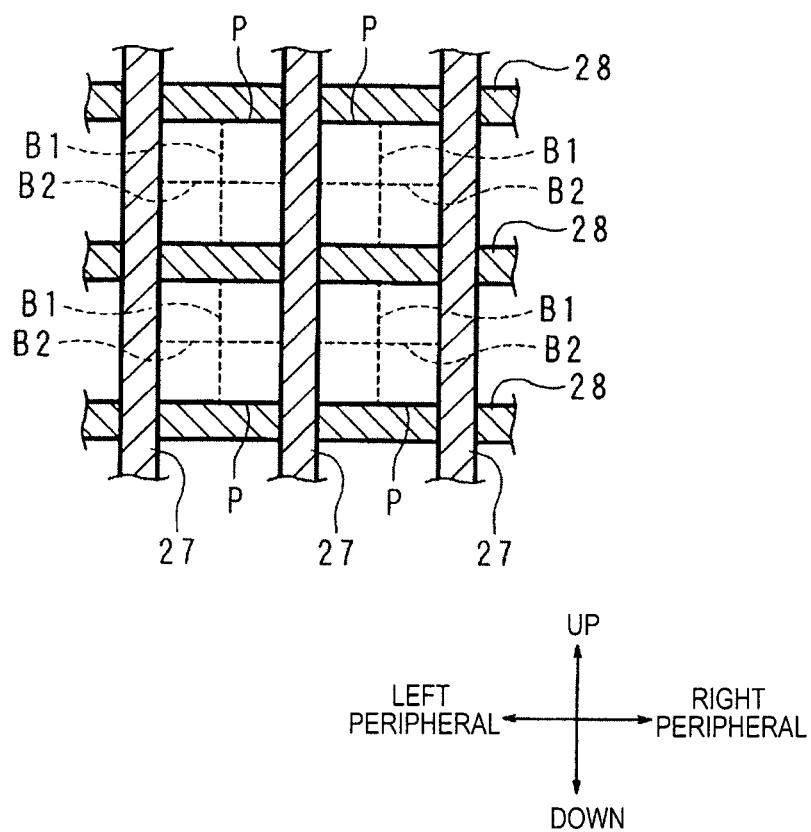
FIG. 10 is a front view schematically showing pixels in a liquid crystal panel of a liquid crystal display apparatus.

FIG. 10 is a front view schematically showing pixels in the liquid crystal panel 11 of the liquid crystal display apparatus 1. Thick solid lines shown in FIG. 10 illustrate the periphery of the respective pixels P. FIG. 10 shows four adjacent pixels P along the up-down direction and the peripheral direction.

The liquid crystal display apparatus 1 of the present embodiment is substantially identical in construction to the liquid crystal display apparatus 1 of Embodiment 1. Hereinafter, differences from Embodiment 1 will be described, while any portion having a corresponding counterpart in Embodiment 1 will be denoted by an identical reference numeral, with its description being omitted.

The color filter layer 32 according to the present embodiment does not include a BM 35, but includes a plurality of light-shielding members 39. The hatching in FIG. 9 represents the light-shielding members 39.

The light-shielding members 39 are intended to shield the TFTs 25 from light. Therefore, the locations of the light-shielding members 39 correspond to the locations of the TFTs 25. The light-shielding members 39 are provided by applying photolithography to a layer of light-shielding material which has been formed on the rear surface of the glass substrate 31.

The colored layers 36 are similar to the colored layers 36 in Embodiment 1, except that they do not close the openings 37 in the BM 35; to achieve this, the colored layers 36 are provided by applying photolithography to a colored material layer which has been formed on the light-shielding members 39 and on the rear surface of the glass substrate 31.

The TFT layer 22 according to the present embodiment includes pixel electrodes 24 and TFTs 25, and a plurality of signal lines 27 and a plurality of gate lines 28. In FIG. 10, hatching lines extending in the upper-right direction represent the signal lines 27, whereas hatching lines extending in the lower-right direction represent the gate lines 28.

The signal lines 27 and the gate lines 28 are similar to the signal lines and gate lines in the TFT layer 22 in Embodiment 1.

Each pixel P is surrounded by two adjacent gate lines 28 28 along the up-down direction and two adjacent signal lines 27 along the peripheral direction. In other words, pixels P are delineated by the signal lines 27 and the gate lines 28. The signal lines 27 are cross-direction light shielding portions, whereas the gate lines 28 are peripheral-direction light shielding portions.

The signal lines 27 and the gate lines 28 are included in the TFT layer 22. Therefore, regarding the peripheral direction, dislocations of the signal lines 27 and the gate lines 28 relative to any other points of reference in the TFT layer 22 are negligibly small.

The light-shielding members 39 may unintendedly shade the inside of the pixel P because of dislocations regarding the peripheral direction that are caused by curving. However, the geometric area in which a light-shielding member 39 may shade a pixel P is negligibly small as compared to, for example, the geometric area in which a light shielding portion in the BM 35 may shade the inside of a pixel P.

Consequently, the area ratio between domains in each pixel P of the liquid crystal panel 11 in an uncurved state and the area ratio between domains in each pixel P of the liquid crystal panel 11 in a curved state are substantially equal.

The liquid crystal display apparatus 1 as such can achieve a similar operation and effect to what is achieved by the liquid crystal display apparatus 1 of Embodiment 1. Moreover, it is possible to prevent deteriorations in the viewing angle characteristics associated with dislocations of light shielding portions of the BM 35 due to curving.

Since the light-shielding members 39 are included in the counter substrate 3, the light-shielding material composing the light-shielding members 39 is not likely to unfavorably affect the TFT layer 22 in the TFT substrate 2.

Embodiment 4

The liquid crystal display apparatus 1 of the present embodiment is substantially identical in construction to the liquid crystal display apparatus 1 of Embodiment 1. Hereinafter, differences from Embodiment 1 will be described, while any portion having a corresponding counterpart in Embodiment 1 will be denoted by an identical reference numeral, with its description being omitted.

A number of pixels P occupy different portions, one each, of a single opening 37. Pixels P are delineated by the peripheral-direction light shielding portions 351 in the BM 35 (see Embodiment 2) and the signal lines 27 in the TFT layer 22 (see Embodiment 3).

The liquid crystal display apparatus 1 as such can achieve a similar operation and effect to what is achieved by the liquid crystal display apparatus 1 of Embodiment 2. The reason is that dislocations of the peripheral-direction light shielding portions 351 regarding the peripheral direction do not unfavorably affect the area ratio between domains. Moreover, the signal lines 27 hardly undergo any dislocation regarding the peripheral direction, and thus do not unfavorably affect changes in the area ratio between domains.

In the liquid crystal display apparatus 1 according to Embodiments 1 to 4, the front side presents a convex curve, it may alternatively be the rear side that presents a convex curve. The axial direction of the liquid crystal display apparatus 1 in a cylindrical surface shape may not be the up-down direction (e.g., the right-left direction).

In all aspects, the embodiments disclosed herein are to be considered illustrative rather than restrictive. Rather than the aforementioned, it is intended that the scope of the present invention encompasses any and all modifications within the scope of the claims and the equivalents thereof.

So long as the effects of the present invention are preserved, any component elements that are not disclosed in Embodiments 1 to 4 may be included in the liquid crystal panel 11 or the liquid crystal display apparatus 1.

The constituent elements (technological features) disclosed in each embodiment may be combined, and any such combination may result in a new technological feature.

What is claimed is:

1. A liquid crystal panel comprising:
   a liquid crystal layer containing liquid crystal molecules;
   a first alignment film in contact with a front surface of the liquid crystal layer; and
   a second alignment film in contact with a rear surface of the liquid crystal layer,
   the liquid crystal panel being curved in the shape of a cylindrical surface, wherein,
   the first alignment film includes a plurality of first strip portions extending along a first direction and causing the liquid crystal molecules to be aligned;
   the second alignment film includes a plurality of second strip portions extending along a second direction and causing the liquid crystal molecules to be aligned;
   the first direction is a peripheral direction of the cylindrical surface; and
   the second direction is a direction which crosses the peripheral direction;
   the liquid crystal panel further including a plurality of first light shielding portions extending along the peripheral direction, and a plurality of second light shielding portions extending along a direction which crosses the peripheral direction; wherein
   the plurality of first light shielding portions and the plurality of second light shielding portions define a plurality of pixels;
   the plurality of second light shielding portions are closer to a rear surface of the liquid crystal panel than is the second alignment film;
   the plurality of second light shielding portions are a plurality of first wiring lines extending along a direction which crosses the peripheral direction;
   the plurality of first light shielding portions are a plurality of second wiring lines extending along the peripheral direction;
   a plurality of switching elements are in a matrix arrangement, and
   each of the plurality of switching elements is electrically connected to one of the plurality of first wiring lines and one of the plurality of second wiring lines;
   the liquid crystal panel further including a first substrate and a second substrate opposed to each other via the liquid crystal layer, wherein;
   the first substrate includes the first alignment film;
   the first substrate further includes a color filter layer having colored layers and a plurality of light shielding members forming openings therebetween, wherein the colored layers are not disposed in the entire openings;
   the second substrate includes the second alignment film; and
   the second substrate further includes the plurality of first wiring lines and the plurality of second wiring lines.

2. The liquid crystal panel of claim 1, further comprising:
   the plurality of light-shielding members closer to a frontal surface of the liquid crystal panel than the first alignment film, the plurality of light-shielding members shielding the plurality of switching elements from light.

3. The liquid crystal panel of claim 1, each pixel including a plurality of domains in which the liquid crystal molecules are subject to respectively different directions of alignment.

4. A liquid crystal display apparatus comprising:
   the liquid crystal panel of claim 1; and
   an illuminator to illuminate the liquid crystal panel through the rear surface of the liquid crystal panel, wherein,
   the first alignment film is located on the opposite side to the illuminator with respect to the liquid crystal layer; and
   the second alignment film is located on the same side as the illuminator with respect to the liquid crystal layer.

* * * * *